(12) United States Patent
Aoyama et al.

(10) Patent No.: US 10,612,478 B2
(45) Date of Patent: Apr. 7, 2020

(54) COMBUSTION CONTROL DEVICE FOR INTERNAL COMBUSTION ENGINE

(71) Applicant: TOYOTA JIDOSHA KABUSHIKI KAISHA, Toyota-shi, Aichi-ken (JP)

(72) Inventors: Yukitoshi Aoyama, Gotemba (JP); Ryo Hasegawa, Suntou-gun (JP)

(73) Assignee: TOYOTA JIDOSHA KABUSHIKI KAISHA, Toyota-shi, Aichi-ken (JP)

(*) Notice: Subject to any disclaimer, the term of this patent is extended or adjusted under 35 U.S.C. 154(b) by 113 days.

(21) Appl. No.: 15/316,904

(22) PCT Filed: Jul. 2, 2015

(86) PCT No.: PCT/JP2015/003336
§ 371 (c)(1),
(2) Date: Dec. 7, 2016

(87) PCT Pub. No.: WO2016/021110
PCT Pub. Date: Feb. 11, 2016

(65) Prior Publication Data
US 2018/0149097 A1 May 31, 2018

(30) Foreign Application Priority Data

Aug. 7, 2014 (JP) ................... 2014-161747

(51) Int. Cl.
*F02D 35/02* (2006.01)
*F02D 41/00* (2006.01)
(Continued)

(52) U.S. Cl.
CPC ......... *F02D 35/023* (2013.01); *F02D 35/028* (2013.01); *F02D 41/009* (2013.01);
(Continued)

(58) Field of Classification Search
CPC ................ F02D 35/023; F02D 35/028; F02D 2200/0614; F02D 41/24; F02D 41/2425; F02D 41/26; F02P 19/028
See application file for complete search history.

(56) References Cited

U.S. PATENT DOCUMENTS

| | | | |
|---|---|---|---|
| 2005/0039721 A1* | 2/2005 | Truscott | F02D 35/023 123/406.22 |
| 2008/0162017 A1* | 7/2008 | Nagata | F02D 35/02 701/103 |

(Continued)

FOREIGN PATENT DOCUMENTS

| | | | |
|---|---|---|---|
| JP | 2006144645 A | * | 6/2006 |
| JP | 2006144645 A | * | 6/2006 |

(Continued)

OTHER PUBLICATIONS

International Search Report for PCT/JP2015/003336 dated Nov. 19, 2015 [PCT/ISA/210].

(Continued)

*Primary Examiner* — Mahmoud Gimie
*Assistant Examiner* — Joshua Campbell
(74) *Attorney, Agent, or Firm* — Sughrue Mion, PLLC (57) ABSTRACT

Based on respective signals from the combustion pressure sensor and a crank angle sensor, heat generation amount data in which a heat generation amount and a crank angle are related to each other is generated, and an estimated heat generation amount is calculated based on a fuel amount in the combustion cycle. When a final value of a heat generation amount in the combustion cycle is smaller than the estimated heat generation amount, the combustion state parameter is calculated based on the heat generation amount data to a crank angle corresponding to the final value of the heat generation amount. When the final value of the heat generation amount is equal to or larger than the estimated (Continued)

heat generation amount, the combustion state parameter is calculated based on the heat generation amount data to a crank angle at which the heat generation amount reaches the estimated heat generation amount.

10 Claims, 6 Drawing Sheets

(51) Int. Cl.
*F02P 19/02* (2006.01)
*G01L 9/00* (2006.01)
*F02D 41/26* (2006.01)
*F02D 41/24* (2006.01)

(52) U.S. Cl.
CPC .......... *F02P 19/028* (2013.01); *G01L 9/0002* (2013.01); *F02D 41/24* (2013.01); *F02D 41/2425* (2013.01); *F02D 41/26* (2013.01); *F02D 2200/0614* (2013.01)

(56) References Cited

U.S. PATENT DOCUMENTS

| | | | |
|---|---|---|---|
| 2010/0071659 A1* | 3/2010 | Moriya | F02D 13/0238 123/406.41 |
| 2011/0125388 A1* | 5/2011 | Catanese | F02D 35/028 701/103 |
| 2011/0209533 A1* | 9/2011 | Yasuda | F02D 35/023 73/114.16 |
| 2012/0046850 A1* | 2/2012 | Yasuda | F02D 35/024 701/102 |
| 2012/0324871 A1* | 12/2012 | Togashi | F01N 1/165 60/311 |
| 2013/0019846 A1* | 1/2013 | Inoue | F02D 41/221 123/568.11 |

FOREIGN PATENT DOCUMENTS

| | | | | |
|---|---|---|---|---|
| JP | 2008-175065 A | | 7/2008 | |
| JP | 2008-202460 A | | 9/2008 | |
| JP | 2009-203938 A | | 9/2009 | |
| JP | 2009-222031 A | | 10/2009 | |
| JP | 2009222031 A | * | 10/2009 | ............ F02P 19/028 |
| JP | 2009222031 A | * | 10/2009 | ............ F02P 19/028 |
| JP | 2010071107 A | * | 4/2010 | ........... F02D 35/028 |
| JP | 2011-220128 A | | 11/2011 | |
| JP | 2013-104407 A | | 5/2013 | |
| JP | 2013-253506 A | | 12/2013 | |

OTHER PUBLICATIONS

Written Opinion for PCT/JP2015/003336 dated Nov. 19, 2015 [PCT/ISA/237].

* cited by examiner

16: COMBUSTION CHAMBER

COMBUSTION CONTROL DEVICE FOR INTERNAL COMBUSTION ENGINE

CROSS REFERENCE TO RELATED APPLICATIONS

This application is a National Stage of International Application No. PCT/JP2015/003336 filed Jul. 2, 2015, claiming priority based on Japanese Patent Application No. 2014-161747 filed Aug. 7, 2014, the contents of all of which are incorporated herein by reference in their entirety.

TECHNICAL FIELD

The present invention relates to a combustion control device for an internal combustion engine, and more particularly relates to a combustion control device for an internal combustion engine including a combustion pressure sensor.

BACKGROUND ART

There is known a combustion pressure sensor (also called a cylinder pressure sensor) that is mounted to a combustion chamber of an internal combustion engine. A combustion pressure sensor outputs a signal corresponding to a magnitude of a pressure in a combustion chamber. A change of a combustion pressure with respect to a crank angle depends on the combustion state in a combustion chamber. Therefore, a signal outputted by the combustion pressure sensor is received, and the signal is processed, whereby a combustion state parameter expressing the combustion state in a combustion chamber can be obtained. The combustion state parameters include a combustion ratio (a ratio of a mass of burned fuel to a mass of fuel in the combustion chamber) in a predetermined crank angle, and a crank angle at which a combustion ratio becomes a predetermined ratio, for example. In the latter, the crank angle at which the combustion ratio becomes 50% is specially called a combustion gravity center or CA 50. These combustion state parameters are used in control of a combustion state. For example, Patent Literature 1 as follows describes using CA 50 in optimum ignition timing control.

Further, concerning the form of a combustion pressure sensor, various proposals are made. For example, Patent Literature 3 discloses a combustion pressure sensor which is integrated with a glow plug. In the glow-plug-integrated type combustion pressure sensor, a heater rod that is a heating element also functions as a pressure receiving member. That is to say, the heater rod is displaced in accordance with the pressure in the combustion chamber, and the signal corresponding to the displacement is outputted from the combustion pressure sensor. However, deposit easily adheres to a periphery of the heater rod. The adhering deposit becomes resistance at the time of the heater rod being displaced, and changes the displacement characteristic of the heater rod to the pressure. If the displacement characteristic of the heater rod to the pressure changes, the output value from the combustion pressure sensor is displaced in relation to the time when adhesion of deposit does not occur. Therefore, in the art disclosed in Patent Literature 3, the adhering state of deposit is determined based on the signal from the combustion pressure sensor, and when adhesion of deposit is recognized, energization is performed to the glow plug, and deposit is burned and removed.

CITATION LIST

Patent Literature

[PTL 1]
Japanese Patent Laid-Open No. 2013-104407
[PTL 2]
Japanese Patent Laid-Open No. 2013-253506
[PTL 3]
Japanese Patent Laid-Open No. 2009-203938
[PTL 4]
Japanese Patent Laid-Open No. 2008-175065
[PTL 5]
Japanese Patent Laid-Open No. 2009-222031
[PTL 6]
Japanese Patent Laid-Open No. 2011-220128
[PTL 7]
Japanese Patent Laid-Open No. 2008-202460

SUMMARY OF INVENTION

Technical Problem

Combustion control using the combustion state parameter such as CA 50 can be also applied to a glow-plug-integrated type combustion pressure sensor. However, a glow-plug-integrated type combustion pressure sensor is configured so that the pressure receiving member is inserted into a hole leading to a combustion chamber, and between the hole and the pressure receiving member, a vacant space for displacing the pressure receiving member in the axial direction in accordance with the pressure in the combustion chamber can be formed. In the combustion pressure sensor having the configuration like this, deposit adheres to the periphery of the pressure receiving member, whereby the displacement characteristic of the pressure receiving member to the pressure is likely to change. In this case, as disclosed in Patent Literature 3, the displacement characteristic of the pressure receiving member can be probably returned to the original displacement characteristic, if the glow plug is caused to heat and deposit is removed. However, not only fuel efficiency is likely to be reduced because electric power for causing the glow plug to heat is required, but also the combustion state in the combustion chamber is likely to change due to heating of the glow plug.

The present invention is made in the light of the problem as described above, and has an object to reduce an influence given to calculation of a combustion state parameter by a change of a displacement characteristic of a pressure receiving member of a combustion pressure sensor that occurs due to adhesion of deposit or the like in a combustion control device that calculates the combustion state parameter for control of a combustion state based on a signal from the combustion pressure sensor.

Solution to Problem

In order to attain the above described object, a combustion control device for an internal combustion engine according to the present invention is configured as follows.

The combustion control device according to the present invention includes a combustion pressure sensor, a crank angle sensor and an arithmetic processing device. The combustion pressure sensor includes a pressure receiving member that is inserted into a hole leading to a combustion chamber of the internal combustion engine. Between the pressure receiving member and the hole leading to the combustion chamber, a vacant space that enables the pressure receiving member to be displaced in an axial direction is left. The combustion pressure sensor is configured to output a signal corresponding to displacement of the pressure receiving member, in response to the pressure receiving member being displaced in accordance with a pressure in the combustion chamber. The crank angle sensor is configured to output a signal that is synchronized with rotation of a crankshaft of the internal combustion engine. The arithmetic processing device is a device that performs arithmetic operation for controlling a combustion state in the combustion chamber, and receives a signal from the combustion pressure sensor and a signal from the crank angle sensor for the arithmetic operation. A detailed configuration of the arithmetic processing device is as follows.

The arithmetic processing device is configured to execute first processing and second processing as follows. In the first processing, the arithmetic processing device calculates a heat generation amount that is a total of a heat amount generated in the combustion chamber from a start of combustion in one combustion cycle for each crank angle, based on the signal from the combustion pressure sensor and the signal from the crank angle sensor. Subsequently, the arithmetic processing device generates heat generation amount data in which the heat generation amount and the crank angle are related to each other. In the second processing, the arithmetic processing device calculates an estimated heat generation amount that is estimated from a fuel amount, based on the fuel amount supplied to the combustion chamber in the combustion cycle.

The arithmetic processing device is configured to further execute third processing when a final value of the heat generation amount in the combustion cycle is equal to or smaller than the estimated heat generation amount, and further execute fourth processing, when the final value of the heat generation amount in the combustion cycle is larger than the estimated heat generation amount. The final value of the heat generation amount is a value which the heat generation amount finally reaches in the combustion cycle. Therefore, when the heat generation amount converges to a fixed value in the combustion cycle, the fixed value can be determined as the final value of the heat generation amount. For example, the heat generation amount at a time point when a heat amount per unit crank angle, which is generated in the combustion chamber, becomes equal to or smaller than zero, or at a time point when the heat amount per unit crank angle, becomes equal to or smaller than zero predetermined times in succession can be calculated as the final value. Further, when the heat generation amount continues to increase until the combustion cycle is changed to a next combustion cycle, the value of the heat generation amount immediately before the combustion cycle is changed to the next combustion cycle can be determined as the final value.

In the third processing, the arithmetic processing device calculates a combustion state parameter expressing the combustion state in the combustion chamber, based on heat generation amount data from a start of combustion to a crank angle corresponding to the final value of the heat generation amount. In the fourth processing, the arithmetic processing device calculates the combustion state parameter, based on heat generation amount data from the start of combustion to a crank angle at which the heat generation amount reaches the estimated heat generation amount. Start of combustion can be determined depending on whether or not the heat amount per unit crank angle, which is generated in the combustion chamber, becomes larger than zero, for example. Calculation of the heat generation amount does not always have to be performed until the final value is obtained. When the heat generation amount reaches the estimated heat generation amount in a process of calculating the heat generation amount for each crank angle, the final value of the heat generation amount always becomes larger than the estimated heat generation amount. Therefore, in this case, calculation of the heat generation amount is finished, and the fourth processing may be executed.

One example of the combustion state parameter is a crank angle at which a combustion ratio becomes a predetermined ratio, and another example is a combustion ratio in a predetermined crank angle. The combustion ratio generally means a ratio of a burned mass out of a mass of fuel per one combustion cycle which is supplied into the combustion chamber. When the combustion state parameter is a parameter related to the combustion ratio, as the combustion ratio in an optional crank angle, a ratio of the heat generation amount in the crank angle to the final value of the heat generation amount is preferably calculated when the third processing is executed. When the fourth processing is executed, as the combustion ratio in an optional crank angle, a ratio of the heat generation amount in the crank angle to the estimated heat generation amount is preferably calculated.

Advantageous Effect of Invention

According to the combustion control device according to the present invention, even when the displacement characteristic of the pressure receiving member of the combustion pressure sensor changes due to adhesion of deposit or the like, and thereby the calculated value of the heat generation amount in a latter period of combustion shows a value larger than an actual value, the range of the heat generation amount data which is the basis of calculation of the combustion state parameter can be specified by setting the estimated heat generation amount based on the supply fuel amount as one reference.

DESCRIPTION OF EMBODIMENTS

Hereinafter, embodiments of the present invention will be described with reference to the drawings. Note that when the numerals such as the number, the quantity, the amount, and the range of each of elements are mentioned in the embodiments shown as follows, the present invention is not limited to the mentioned numerals except for the case specially stated clearly and the case obviously specified as the numerals theoretically. Further, structures, steps and the like described in the embodiments shown as follows are not always essential to the present invention except for the case specially stated clearly and the cases obviously specified as the structures and the steps theoretically.

Embodiment 1

Figure 1:
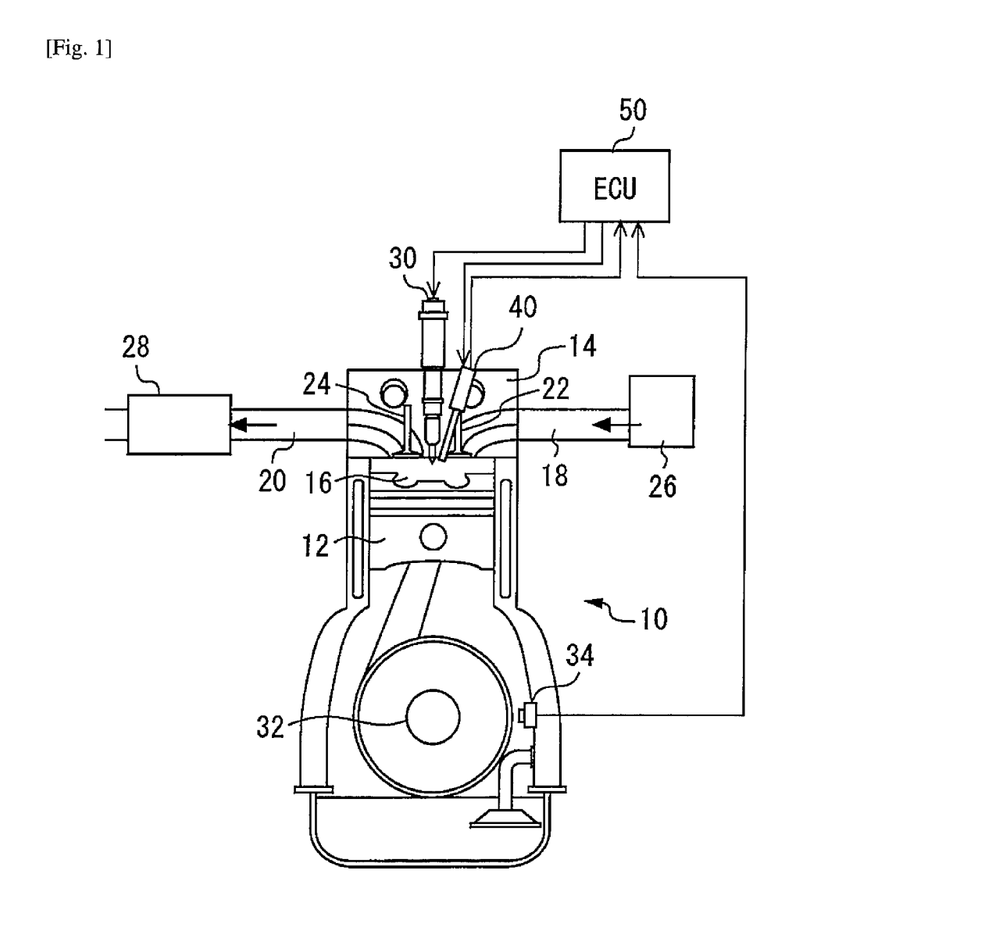
FIG. 1 is a schematic configuration diagram for explaining an engine system of embodiment 1 of the present invention.

FIG. 1 is a schematic configuration diagram for explaining an engine system of embodiment 1 of the present invention. The engine system of embodiment 1 includes an internal combustion engine 10 which is constructed as a compressed self-ignition type diesel engine using light oil as fuel. In a cylinder of the internal combustion engine 10, a piston 12 which reciprocates inside the cylinder is provided. The piston 12 is connected to a crankshaft 32 via a connecting rod. The internal combustion engine 10 includes a crank angle sensor 34 that outputs a signal synchronized with rotation of the crankshaft 32.

The internal combustion engine 10 includes a cylinder head 14. Between the piston 12 and the cylinder head 14, a combustion chamber 16 is formed. One end of an intake passage 18 and one end of an exhaust passage 20 communicate with the combustion chamber 16. In the intake passage 18 and the exhaust passage 20, an intake valve 22 and an exhaust valve 24 are disposed respectively. At an inlet of the intake passage 18, an air cleaner 26 is attached. Further, halfway through the exhaust passage 20, an after treatment device 28 for purifying an exhaust gas is provided. At the cylinder head 14, a fuel injection valve 30 for injecting fuel into the cylinder is provided. Further, at the cylinder head 14, a combustion pressure sensor 40 is mounted in such a manner as to protrude into the combustion chamber 16 from a top portion of the combustion chamber 16. The combustion pressure sensor 40 is a glow-plug-integrated type combustion pressure sensor that also has a function as a glow plug by including a heater rod.

The engine system of embodiment 1 includes an ECU (Electronic Control Unit) 50. The ECU 50 includes a memory and a processor not illustrated as a physical configuration. The memory stores a program for engine control, and the processor reads the program from the memory and executes the program. The ECU 50 receives a signal from the crank angle sensor 34 and a signal from the combustion pressure sensor 40. The engine system is provided with various other sensors, but explanation thereof will be omitted here. Further, the ECU 50 outputs a drive signal to the fuel injection valve 30, and supplies an electric current to the glow plug of the combustion pressure sensor 40.

The ECU 50 functions as an arithmetic processing device according to the present invention, and configures a combustion control device according to the present invention together with the combustion pressure sensor 40 and the crank angle sensor 34. The ECU 50 as the arithmetic processing device calculates a combustion state parameter which will be described later, based on the respective signals from the combustion pressure sensor 40 and the crank angle sensor 34 and a fuel injection amount of the fuel injection valve 30, and controls a combustion state in the combustion chamber 16 based on the combustion state parameter. The combustion state parameter which is calculated in this embodiment is CA 50. Further, in this embodiment, the combustion state is controlled by feeding CA 50 back in timing for injecting fuel from the fuel injection valve 30.

One of features of embodiment 1 is arithmetic processing for calculation of the combustion state parameter, which is programmed in the ECU 50. The arithmetic processing which is programmed in the ECU 50 relates to a problem according to a structure of the combustion pressure sensor 40. Hereinafter, details and the problem of the structure of the combustion pressure sensor 40 will be described with reference to FIG. 2.

Figure 2:
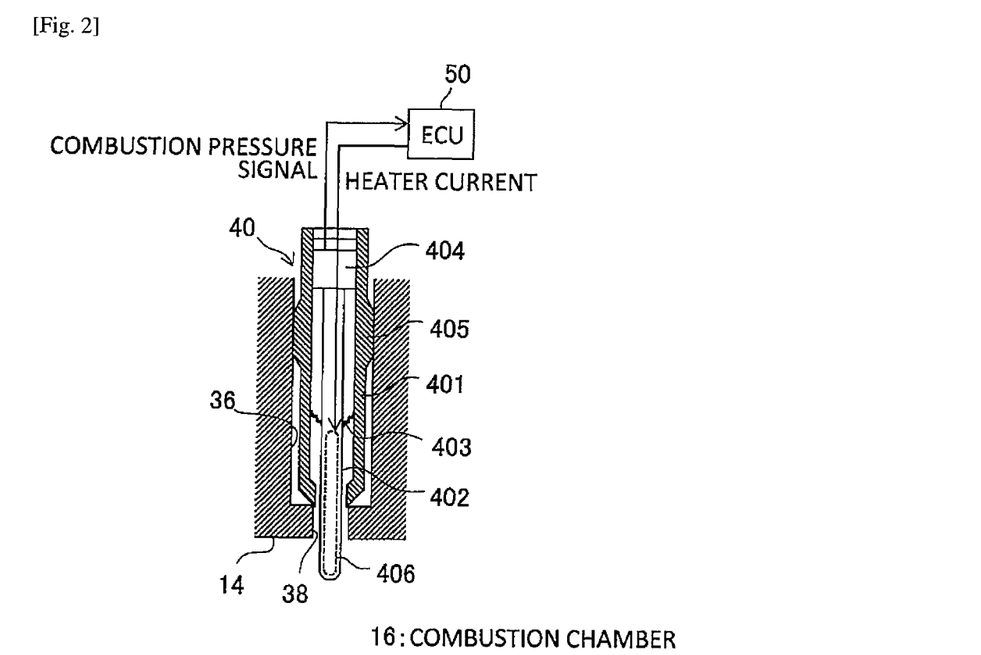
FIG. 2 is a sectional view showing a combustion pressure sensor fitted to a cylinder head and a periphery of the combustion pressure sensor.

FIG. 2 is a sectional view showing the combustion pressure sensor 40 which is fitted to the cylinder head 14, and a periphery of the combustion pressure sensor 40. As shown in FIG. 2, the combustion pressure sensor 40 is a glow-plug-integrated type combustion pressure sensor, and is in a shape in which a heater rod 402 protrudes in an axial direction from a tip end of a cylindrical housing 401. A heating element 406 is built in the heater rod 402. The heating element 406 generates heat by receiving supply of an electric current from the ECU 50, and thereby the combustion pressure sensor 40 functions as a glow plug.

Inside the housing 401, a strain gauge 404 which is in contact with an end portion of the heater rod 402 is disposed. In a gap between the housing 401 and the heater rod 402, a seal 403 which closes the gap is provided. The seal 403 functions as a partition wall that airtightly divides the combustion chamber 16 side and the strain gauge 404 side. The heater rod 402 functions as a pressure receiving member that receives pressure in the combustion chamber 16, and a pressure difference between the combustion chamber 16 side and the strain gauge 404 side becomes a drive force that displaces the heater rod 402 to the strain gauge 404 side. The strain gauge 404 outputs a signal corresponding to the displacement in the axial direction of the heater rod 402, that is, a signal corresponding to the pressure in the combustion chamber 16, in response to the heater rod 402 being displaced in the axial direction by the pressure in the combustion chamber 16.

The combustion pressure sensor 40 is inserted into an insertion hole 36 provided in the cylinder head 14. A male thread 405 is formed on the housing 401. The male thread 405 is screwed into a female thread not illustrated and formed in the insertion hole 36, whereby the combustion pressure sensor 40 is fixed to the cylinder head 14. A hole 38 leading to the combustion chamber 16 communicates with an inner part of the insertion hole 36. A diameter of the hole 38 is smaller than a diameter of the insertion hole 36. When the combustion pressure sensor 40 is inserted in and fixed to the insertion hole 36, a tip end of the heater rod 402 penetrates through the hole 38 and protrudes into the combustion chamber 16. Between the hole 38 and the heater rod 402, a vacant space for enabling the heater rod 402 to be displaced in the axial direction is provided.

As is understandable from the above configuration, the periphery of the heater rod 402 which is the pressure receiving member communicates with the combustion chamber 16, and the periphery has a room for a combustion gas to enter. The combustion gas contains unburned components and an oil component of fuel. Oxides and carbon substances formed by these components being liquefied and going through reactions by ambient heat form deposit. In the case of the configuration shown in FIG. 2, deposit can adhere to the gap between the heater rod 402 and the hole 38, and a gap between the heater rod 402 and the housing 401.

The adhering deposit becomes resistance at a time of the heater rod 402 being displaced in the axial direction. In an early period of combustion in which the pressure in the combustion chamber 16 rises, an influence of a resistance force received by the heater rod 402 from deposit is small. This is because a force of the rising combustion pressure pressing the heater rod 402 to the side of the strain gauge 404 is much larger as compared with the resistance of deposit, and as compared with the force, the resistance of deposit is small enough to be ignored. In a latter period of combustion in which the pressure in the combustion chamber 16 is reduced, a restoring force (a spring force) of the strain gauge 404 and a restoring force of the seal 403 respectively act on the heater rod 402. The restoring forces are significantly smaller as compared with the force by the combustion pressure which acts on the heater rod 402 in the early period of combustion, and therefore, the influence of the resistance force which the heater rod 402 receives from deposit becomes relatively large. As a result, the combustion pressure which is measured from the signal from the combustion pressure sensor 40 in the early period of combustion favorably correspond to an actual combustion pressure, that is, a combustion pressure which is measured when deposit does not adhere, irrespective of an adhering amount of deposit. However, the combustion pressure which is measured from the signal from the combustion pressure sensor 40 in the latter period of combustion indicates a pressure higher than the actual combustion pressure due to an influence of the resistance force received from deposit.

Figure 3:
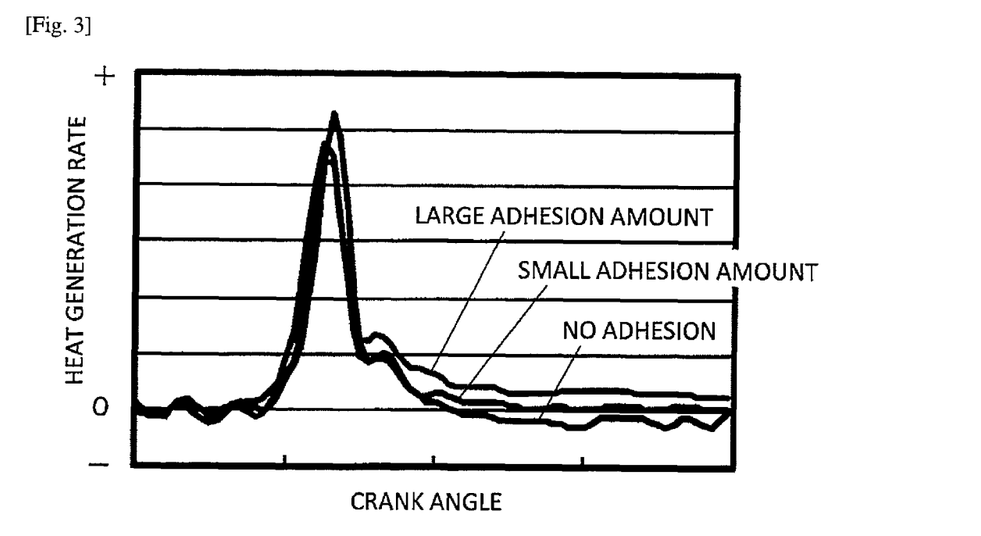
FIG. 3 is a diagram showing relation of a heat generation rate calculated based on a signal of the combustion pressure sensor and a crank angle.

FIG. 3 is a diagram showing a change of relation of a heat generation rate calculated based on the signal from the combustion pressure sensor 40 and a crank angle. The heat generation rate is a heat amount per unit crank angle, which is generated in the combustion chamber 16, and can be calculated from the pressure in the combustion chamber 16 according to the following mathematical expression, "Math. 1". However, the pressure which is obtained from the signal from the combustion pressure sensor 40 is a relative pressure, and therefore, is used as the pressure in the combustion chamber 16 after the pressure is corrected to an absolute pressure. In the following mathematical expression, Q represents a heat generation amount, θ represents a crank angle, P represents a pressure in the combustion chamber 16, V represents a volumetric capacity of the inside of the combustion chamber 16, κ represents a specific heat ratio, dQ in a left side represents a heat generation rate, and dθ represents a unit crank angle. The volumetric capacity V in the combustion chamber 16 can be expressed as a function of the crank angle θ.

[Math. 1]

In FIG. 3, curves showing changes of heat generation rates (calculated values by the above described mathematical expression) with respect to the crank angle are drawn, with respect to three examples that are an example without adhesion of deposit, an example with a small amount of adhesion of deposit, and an example with a large adhesion amount of deposit. First, the change of the heat generation rate with respect to the crank angle in the case without adhesion of deposit will be described. The heat generation rate of zero (or substantially zero) means that combustion is not started in the combustion chamber 16. A crank angle at which the heat generation rate starts to rise is a combustion start angle. After start of combustion, the heat generation rate continues to rise to reach a peak eventually. After passing the peak, the heat generation rate is decreasing to be zero ultimately. A crank angle at which the heat generation rate becomes zero (or regarded as converging to zero) is a combustion end angle (a crank angle at which combustion is estimated to end) at which combustion in the combustion chamber 16 is ended.

Relation of the heat generation rate and the crank angle in the early period of combustion shows similar relation irrespective of presence or absence of adhesion of deposit. However, in the latter period of combustion, the influence which the resistance by deposit has on the signal from the combustion pressure sensor 40 becomes very large, and therefore, the relation between the heat generation rate and the crank angle changes in accordance with the adhesion amount of deposit. More specifically, as the adhesion amount of deposit is larger, the heat generation rate which is calculated based on the combustion pressure remains to indicate a value larger than an actual heat generation rate (the heat generation rate in the case without adhesion of deposit). Thereby, the crank angle at which the heat generation rate becomes zero is shifted to a delay angle side significantly from the actual combustion end angle (the combustion end angle in the case without adhesion of deposit).

Figure 4:
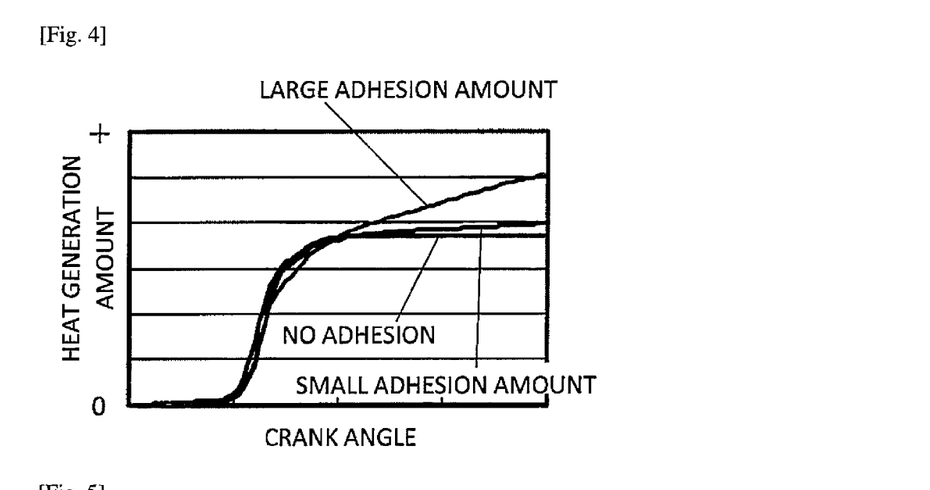
FIG. 4 is a diagram showing relation of a heat generation amount calculated from heat generation rate data shown in FIG. 3 and the crank angle.

FIG. 4 is a diagram showing relation between the heat generation amount calculated from heat generation rate data shown in FIG. 3 and the crank angle. The heat generation amount is a total amount of a heat amount generated in the combustion chamber 16 in one combustion cycle from the start of combustion. Therefore, the heat generation amount in an optional crank angle is calculated by integrating the heat generation rate calculated at each unit crank angle with an angle from the combustion start angle to the optional crank angle set as an integration interval. An amount of heat generated in the combustion chamber 16 in one combustion cycle is a final heat generation amount, that is, a final value of the heat generation amount. A heat generation amount (an actual heat generation amount) in the case without adhesion of deposit converges to a fixed value at a certain crank angle. The crank angle at the time of the heat generation amount converging to a fixed value is a combustion end angle.

In the case with adhesion of deposit, the heat generation amount calculated based on the heat generation rate also continues to increase even after the actual heat generation amount converges to a fixed value. The calculated final heat generation amount becomes a larger value as the adhesion amount of deposit is larger. The final heat generation amount in the case with a large adhesion amount of deposit should be a value larger than the heat generation amount at the maximum value on the horizontal axis in FIG. 4. This is because as shown in FIG. 3, the heat generation rate in the case with a large adhesion amount of deposit does not become zero in the maximum value of the horizontal axis. However, in this case, in order to simplify the explanation, the heat generation amount at the maximum value in the horizontal axis in FIG. 4 is regarded as a final heat generation amount in the case with a large adhesion amount of deposit.

Figure 5:
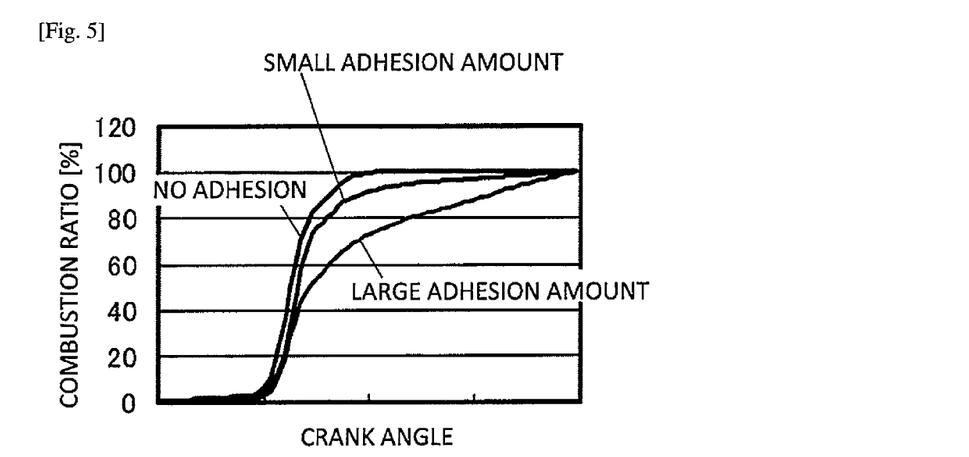
FIG. 5 is a diagram showing relation of a combustion ratio calculated from heat generation amount data shown in FIG. 4 and the crank angle.

FIG. 5 is a diagram showing relation of a combustion ratio calculated from the heat generation amount data shown in FIG. 4 and the crank angle. The combustion ratio is also called a combustion mass ratio, and means a ratio of a mass of combusted fuel to a mass of fuel per one combustion cycle, which is supplied into the combustion chamber 16. In embodiment 1, a combustion ratio in an optional crank angle is calculated as a ratio of the heat generation amount at the optional crank angle to the final heat generation amount. Therefore, as is understandable from comparison of the three curves shown in FIG. 5, the combustion ratio in an optional crank angle has a smaller value as the adhesion amount of deposit is larger. Further, the crank angle which gives an optional combustion ratio becomes a crank angle at a more delaying side as the adhesion amount of deposit is larger. Therefore, the crank angle at which CA 50 is achieved, that is, the combustion ratio becomes 50% has a value more shifted to a delay side from the actual CA 50 (CA 50 in the case without adhesion) as the adhesion amount of deposit is larger.

As described above, the deposit adhering to the combustion pressure sensor 40 changes the displacement characteristic of the heater rod 402 which is the pressure receiving member, and influences precision of CA 50 which is calculated based on the signal from the combustion pressure sensor 40. If the precision of CA 50 is low, precision of the combustion control to which CA 50 is fed back is also reduced, and it becomes difficult to realize a desired combustion state. Therefore, in the arithmetic processing which is programmed in the ECU 50, contrivance to exclude the influence of deposit from calculation of CA 50 is made. Hereinafter, the contents of the arithmetic processing which is programmed into the ECU 50 will be described with use of FIG. 6.

The ECU 50 as the arithmetic processing device calculates a heat generation amount from a fuel injection amount of the fuel injection valve 30, apart from the heat generation amount which is calculated from the heat generation rate. In the configuration of the internal combustion engine 10 of embodiment 1, the fuel injection amount means the amount of fuel that is supplied to the combustion chamber 16. By combustion of the supplied fuel, heat is generated in the combustion chamber 16. The heat generation amount by combustion of the supplied fuel (the injected fuel by the fuel injection valve 30) can be calculated by an expression "Heat generation amount=fuel injection amount×lower heating value×heat generation efficiency". The lower heating value changes in accordance with a cetane number of fuel (light oil) to be precise, but a difference by the cetane number is small, and therefore, the lower heating value in the above described expression can be made a constant. The heat generation efficiency is influenced by a water temperature, an intake air temperature, an engine speed, or the like to be precise, and therefore, can be determined from a map having these conditions as parameters. However, the heat generation efficiency is a value which is substantially close to one, and therefore, the heat generation efficiency in the above described expression can be made one which is the maximum value. Hereinafter, the heat generation amount calculated from the fuel injection amount will be called an estimated heat generation amount.

The heat generation amount which is obtained by integrating the heat generation rates is a total heat generation amount from start of combustion, but does not exceed the estimated heat generation amount theoretically. This is because the estimated heat generation amount is an upper limit value of the amount of heat that can be generated by the fuel being combusted in the combustion chamber 16. Therefore, when the heat generation amount which is calculated by integrating the heat generation rate exceeds the estimated heat generation amount, the amount of heat by which the heat generation amount exceeds the estimated heat generation amount can be considered as the amount of the influence of the deposit adhering to the combustion pressure sensor 40.

Figure 6:
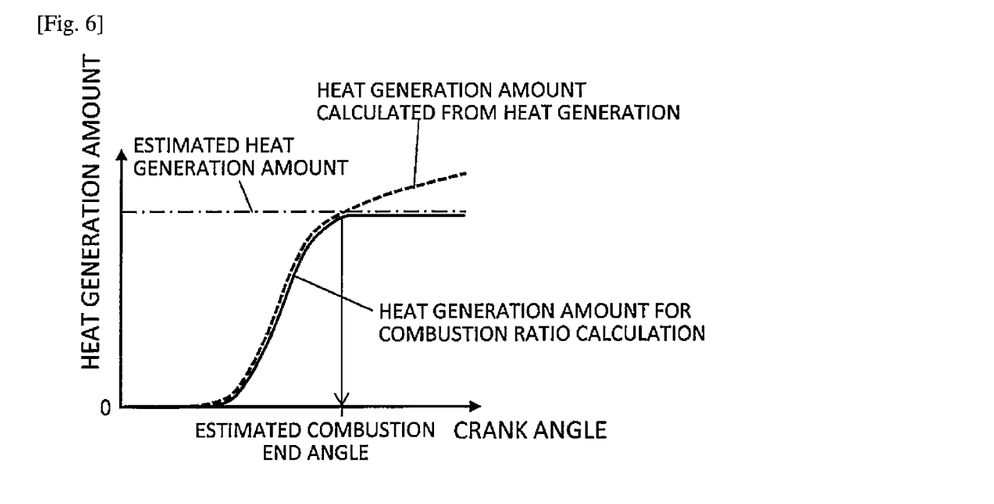
FIG. 6 is a diagram for explaining a content of arithmetic processing which is programmed in an ECU.

In the arithmetic processing programmed into the ECU 50, combustion in the fuel combustion chamber 16 is regarded as being ended in the crank angle at which the heat generation amount calculated by integration of the heat generation rate reaches the estimated heat generation amount, as shown in FIG. 6. Hereinafter, the crank angle at which the heat generation amount reaches the estimated heat generation amount will be called an estimated combustion end angle. In the calculation method in embodiment 1, the estimated heat generation amount is regarded as a real final heat generation amount, instead of the final heat generation amount obtained by integration of the heat generation rate, and it is considered that the heat generation amount does not change at the crank angle after the estimated combustion end angle. That is to say, in the arithmetic processing which is programmed into the ECU 50, the combustion ratio is calculated based on the data within the range up to the estimated combustion end angle, of the heat generation amount data in which the heat generation amount and the crank angle are related to each other shown in FIG. 4.

Figure 7:
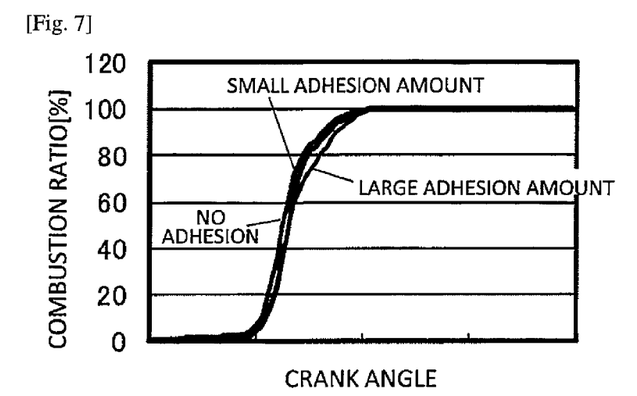
FIG. 7 is a diagram showing relation of a combustion ratio that is recalculated by applying the arithmetic processing which is programmed in ECU to the heat generation amount data shown in FIG. 4 and the crank angle.

FIG. 7 is a diagram showing relation of the combustion ratio which is recalculated by applying the aforementioned arithmetic processing to the heat generation amount data shown in FIG. 4 and the crank angle. Here, the final heat generation amount in the case without adhesion of deposit in the heat generation amount data shown in FIG. 4 is assumed to be equal to the estimated heat generation amount, and the estimated combustion end angles are calculated with respect to the case with small adhesion of deposit, and the case with large adhesion of deposit respectively. Subsequently, the combustion ratio at each crank angle is calculated based on the data in the range up to the estimated combustion end angle, and the relation of the combustion ratio and the crank angle is shown in FIG. 7, with respect to each of the case with small adhesion of deposit and the case of large adhesion of deposit. By comparison of FIG. 7 and FIG. 5, it can be confirmed that according to the arithmetic processing which is programmed into the ECU 50, the influence of adhesion of deposit can be excluded from the relation of the combustion ratio and the crank angle.

Figure 8:
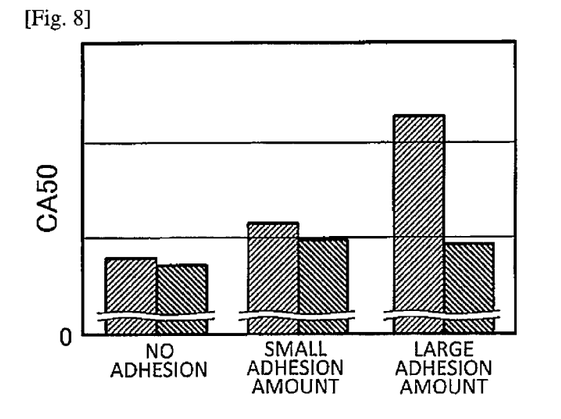
FIG. 8 is a diagram showing by comparison CA 50 that is calculated from the combustion ratio data shown in FIG. 5 with CA 50 that is calculated from the combustion ratio data shown in FIG. 7.

FIG. 8 is a diagram showing CA 50 that is calculated from the combustion ratio data shown in FIG. 5, and CA 50 that is calculated from the combustion ratio data shown in FIG. 7 by a bar chart under comparison. In each item, a bar at the left side indicates CA 50 calculated from the data shown in FIG. 5, whereas a bar at the right side indicates CA 50 that is calculated from the combustion ratio data shown in FIG. 7. CA 50 calculated from the combustion ratio data shown in FIG. 5 is shifted to a more delaying side as the adhesion amount of deposit is larger, whereas CA 50 calculated from the combustion ratio data shown in FIG. 7 is kept at a substantially fixed value substantially without being influenced by the presence or absence of adhesion of deposit and the adhesion amount. As can be confirmed from the chart, the aforementioned arithmetic processing is applied to calculation of CA 50, whereby the influence of the deposit can be excluded from calculation of CA 50.

Figure 9:
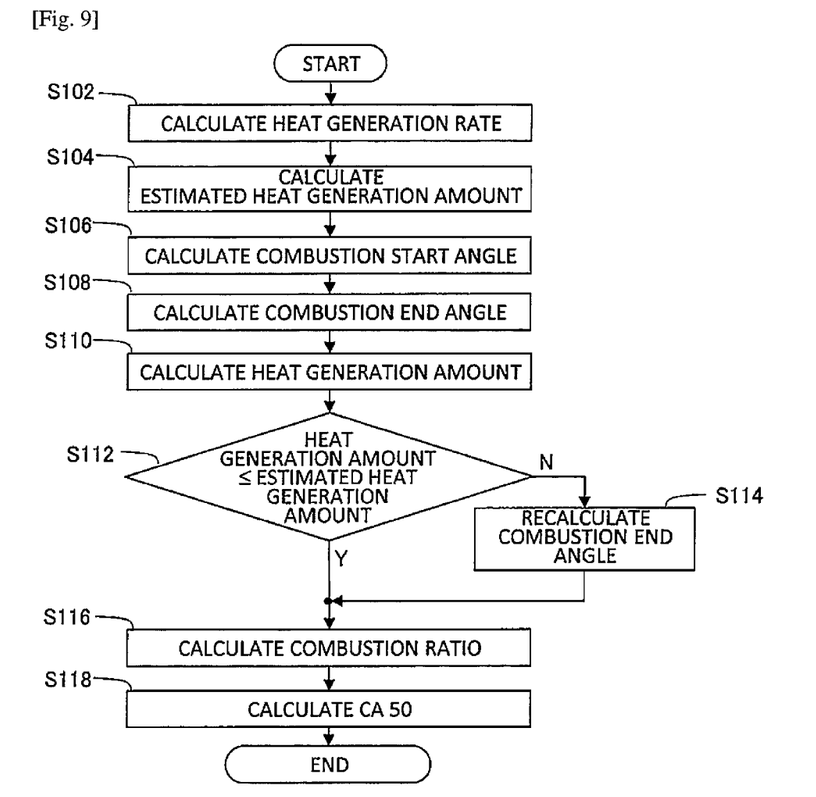
FIG. 9 is a flowchart expressing a specific flow of the arithmetic processing which is programmed in the ECU in embodiment 1 of the present invention.

FIG. 9 is a flowchart expressing a specific flow of the arithmetic processing which is programmed into the ECU 50 in embodiment 1. The ECU 50 executes the arithmetic processing shown in the flowchart in the combustion cycle at each time. Hereinafter, a calculation flow of CA 50 in embodiment 1 will be described along the flowchart.

In step S102, the ECU 50 calculates the heat generation rate at each crank angle based on the signal from the combustion pressure sensor 40, and generates the heat generation rate data in which the heat generation rate and the crank angle are related to each other.

In step S104, the ECU 50 calculates the estimated heat generation amount based on the fuel injection amount of the combustion cycle of this time.

In step S106, the ECU 50 calculates the combustion start angle based on the heat generation rate data which is generated in step S102. For example, the crank angle at which the heat generation amount changes to a positive value from a negative value may be calculated as the combustion start angle.

In step S108, the ECU 50 calculates the combustion end angle based on the heat generation rate data generated in step S102. For example, the crank angle at which the heat generation amount changes to a negative value from a positive value may be calculated as the combustion end angle.

In step S110, the ECU 50 sets a range from the combustion start angle which is calculated in step S106 to the combustion end angle which is calculated in step S108 as an integration interval of the heat generation rate. Subsequently, the ECU 50 calculates the heat generation amount at each crank angle by integrating the heat generation rate in the set integration interval, and generates the heat generation amount data in which the heat generation amount and the crank angle are related to each other.

In step S112, the ECU 50 compares a final value of the heat generation amount calculated in step S110, and the estimated heat generation amount calculated in step S104. If the final value of the heat generation amount is equal to or smaller than the estimated heat generation amount, the signal from the combustion pressure sensor 40 is not influenced by adhesion of deposit. In this case, the ECU 50 executes processing in step S116 and processing in step S118 in succession.

In step S116, the ECU 50 calculates the combustion ratio at each crank angle based on the heat generation amount data in the range from the combustion start angle calculated in step S106 to the combustion end angle calculated in step S108, and generates the combustion ratio data in which the combustion ratio and the crank angle are related to each other. Subsequently, in step S118, the ECU 50 determines the crank angle at which the combustion ratio becomes 50% based on the combustion ratio data generated in step S116, and calculates the crank angle as CA 50.

When the final value of the heat generation amount is determined as larger than the estimated heat generation amount in step S112, the signal from the combustion pressure sensor 40 is influenced by adhesion of deposit. In this case, the ECU 50 executes processing in step S114, and thereafter executes the processing in step S116 and the processing in step S118.

In step S114, the ECU 50 recalculates the combustion end angle with the estimated heat generation amount taken into consideration. That is to say, the ECU 50 calculates the estimated combustion end angle which is the crank angle at which the heat generation amount reaches the estimated heat generation amount.

In step S116, the ECU 50 calculates the combustion ratio at each crank angle based on the heat generation amount data in the range from the combustion start angle calculated in step S106 to the combustion end angle (the estimated combustion end angle) which is recalculated in step S114, and generates the combustion ratio data in which the combustion ratio and the crank angle are related to each other. Subsequently, in step S118, the ECU 50 determines the crank angle at which the combustion ratio becomes 50% based on the combustion ratio data generated in step S116, and calculates the crank angle as CA 50.

By calculating CA 50 in accordance with the above described calculation flow, the CA 50 can be calculated precisely without being influenced by deposit adhering to the combustion pressure sensor 40. Therefore, according to the arithmetic processing executed by the ECU 50 in embodiment 1, even in the situation where deposit adheres to the combustion pressure sensor 40, precision of the combustion control using the CA 50 can be kept.

In the above described calculation flow, the processes in steps S102, S106, S108 and S110 correspond to "first processing" according to the present invention, and the processing in step S104 corresponds to "second processing". Further, the processes in step S116 and S118 in the case of the determination result in step S112 being affirmative correspond to "third processing", and the processes in steps S114, S116 and S118 in the case of the determination result in step S112 being negative correspond to "fourth processing".

In addition to the function as the arithmetic processing device which executes the above described arithmetic processing, the ECU 50 can also function as a heater energization control device. When the ECU 50 functions as the heater energization control device, the ECU 50 executes deposit burning control shown in a flowchart in FIG. 10. When adhesion of deposit advances, adhesion of deposition is likely to influence the signals from the combustion pressure sensor 40 not only in the latter period of combustion but also in the early period of combustion. Therefore, when the ECU 50 can estimate that the adhesion amount of deposit exceeds an allowable limit, the ECU 50 energizes the glow plug which is integrated with the combustion pressure sensor 40, and causes the glow plug to heat to burn the deposit.

The ECU 50 executes the deposit burning control in the combustion cycle at each time. According to the flowchart in FIG. 10, the ECU 50 determines whether or not the heat generation amount is equal to or smaller than a predetermined determination value in step S122. The heat generation amount which is referred to in step S122 is the heat generation amount which is calculated at the time of the first execution of step S110 in the above described arithmetic processing. As the adhesion amount of deposit becomes larger, the heat generation amount calculated based on the signal from the combustion pressure sensor 40 increases, and therefore, the heat generation amount can be used as a characteristic amount indicating the adhesion amount of deposit. The determination value which is used in step S122 corresponds to the heat generation amount at the time when the adhesion amount of deposit reaches an allowable value.

Figure 10:
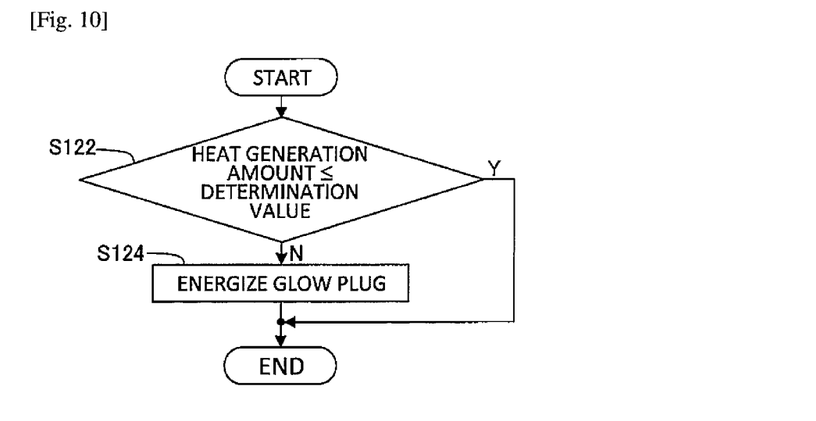
FIG. 10 is a diagram showing a flow of deposit burning control of embodiment 1 of the present invention.

When the result of the determination in step S122 is affirmative, it can be determined that the adhesion amount of deposit does not exceed the allowable value. In this case, the glow plug is not caused to heat.

When the result of the determination in step S122 is negative, it can be determined that the adhesion amount of deposit exceeds the allowable value. In this case, the ECU 50 energizes the glow plug to cause the glow plug to heat in step S124. By the processing, the deposit adhering to the periphery of the heater rod 402 of the combustion pressure sensor 40 is burned by the heat generated by the heater rod 402 and is removed.

By performing the deposit burning control as above, the performance of the combustion pressure sensor 40 can be restored to the original performance without adhesion of deposit. Further, according to the calculation flow of the CA 50 which is executed in embodiment 1, the calculation precision of the CA 50 can be kept even in the situation where a certain amount of deposit adheres, and therefore, the execution frequency of the deposit burning control for removing adhering deposit can be made low. That is to say, worsening of fuel efficiency due to power consumption for causing the glow plug to heat, a change in the combustion state in the combustion chamber 16 due to heating of the glow plug can be restrained to a minimum.

Embodiment 2

Figure 11:
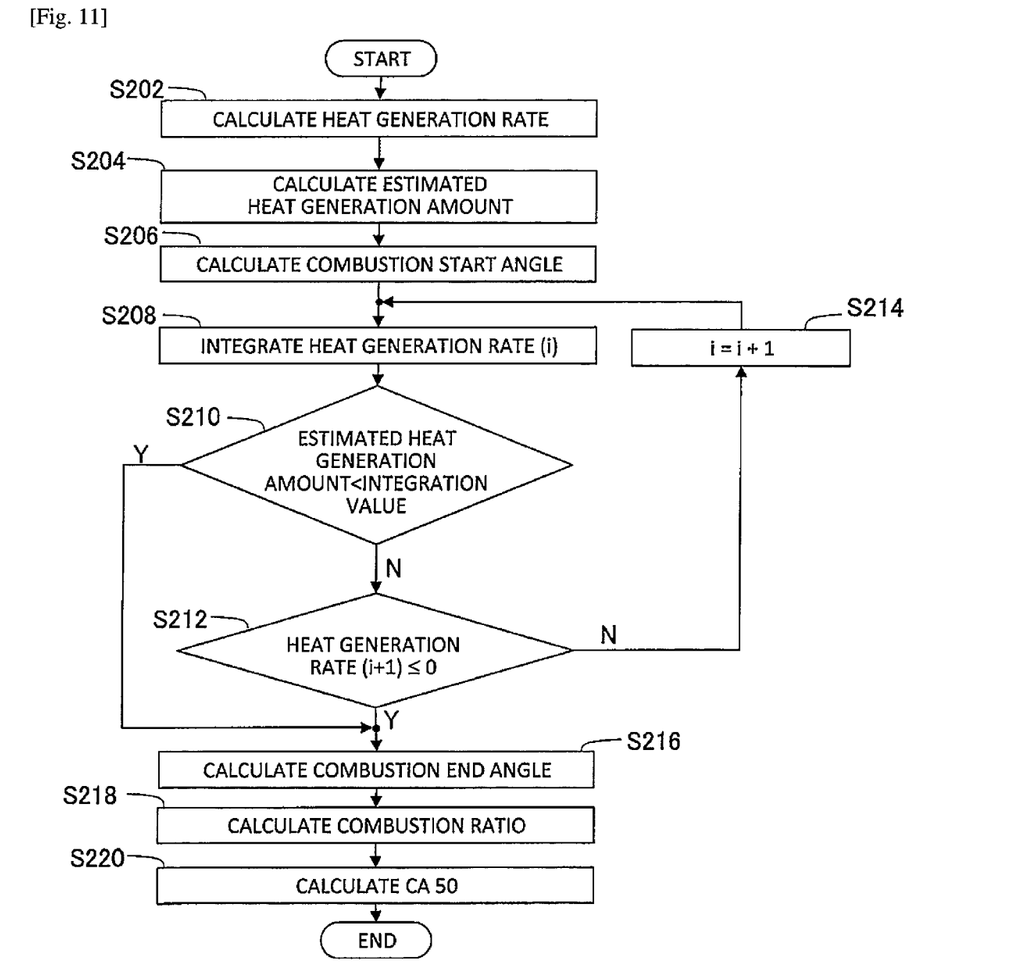
FIG. 11 is a flowchart expressing a specific flow of arithmetic processing which is programmed in the ECU in embodiment 2 of the present invention.

Embodiment 2 has the same system configuration as embodiment 1, but differs from embodiment 1 in the calculation flow of CA 50. FIG. 11 is a flowchart expressing a specific flow of arithmetic processing that is programmed into the ECU 50 in embodiment 2. The ECU 50 executes the arithmetic processing shown in the flowchart in the combustion cycle of each time. Hereinafter, the calculation flow of CA 50 in embodiment 2 will be described in accordance with the flowchart.

In step S202, the ECU 50 calculates the heat generation rate at each crank angle based on the signal from the combustion pressure sensor 40, and generates the heat generation rate data in which the heat generation rate and the crank angle are related to each other.

In step S204, the ECU 50 calculates the estimated heat generation amount based on the fuel injection amount of the combustion cycle of this time.

In step S206, the ECU 50 calculates the combustion start angle based on the heat generation rate data generated in step S202.

In step S208, the ECU 50 integrates the heat generation rate in the sequence of the crank angles based on the heat generation rate data generated in step S202, and generates the heat generation amount data in which the heat generation amount and the crank angle are related to each other. In more detail, every time step S208 is executed, the ECU 50 takes out the heat generation rate in the i-th crank angle from the heat generation rate data, and integrates the i-th heat generation rate which is taken out, into the integration value calculated at the time of execution of step S208 of the previous time, whereby the ECU 50 updates the heat generation amount data. The first crank angle is the combustion start angle which is calculated in step S206. The ECU 50 executes determination in step S210 each time the ECU 50 performs integration of the heat generation rate.

In step S210, the ECU 50 determines whether or not the integration value calculated in step S208 is larger than the estimated heat generation amount calculated in step S204. When the integration value of the heat generation rate does not reach the estimated heat generation amount, the ECU 50 executes determination in step S212 next.

In step S212, the ECU 50 takes out the heat generation rate in a i+1st crank angle from the heat generation rate data, and determines whether or not the value satisfies a combustion end condition. As the combustion end condition, the value of the heat generation rate becoming equal to or smaller than zero, the value of the heat generation rate becoming equal to or smaller than a predetermined value predetermined times in succession or the like can be cited. In this case, the combustion end condition is that the value of the heat generation rate becomes equal to or smaller than zero. When the heat generation rate has a positive value, the ECU 50 increments the number of the crank angle by one in step S214. Subsequently, the ECU 50 executes the processing in step S208 again, and updates the integration value of the heat generation rate.

When the result of the determination in step S212 becomes affirmative before the result of the determination in step S210 becomes positive, that is, when the value of the heat generation rate satisfies the combustion end condition before the integration value of the heat generation rate reaches the estimated heat generation amount, it can be determined that the signal from the combustion pressure sensor 40 is not influenced by adhesion of deposit. In this case, the ECU 50 executes processes in steps S216, S218 and S220 next.

When the result of the determination in step S210 becomes affirmative, that is, when the integration value of the heat generation rate reaches the estimated heat generation amount, it can be determined that the signal from the combustion pressure sensor 40 is influenced by adhesion of deposit. In this case, the ECU 50 executes the processes in steps S216, S218 and S220 next.

In step S216, the ECU 50 calculates the combustion end angle. When step S216 is executed as the result that the result of the determination in step S212 becoming affirmative, the ECU 50 calculates the crank angle at which the heat generation rate becomes equal to or smaller than zero in step S212 as the combustion end angle. When step S216 is executed as a result that the result of the determination in step S210 becomes negative, the ECU 50 calculates the crank angle at which the integration value of the heat generation rate reaches the estimated heat generation amount as the combustion end angle.

In step S218, the ECU 50 calculates the combustion ratio at each crank angle based on the heat generation amount data in the range from the combustion start angle calculated in step S206 to the combustion end angle calculated in step S216, and generates the combustion ratio data in which the combustion ratio and the crank angle are related to each other. Subsequently, in step S220, the ECU 50 determines the crank angle at which the combustion ratio becomes 50% based on the combustion ratio data generated in step S218, and calculates the crank angle as CA 50.

By calculating CA 50 in accordance with the above described calculation flow, CA 50 can be calculated precisely without being influenced by the deposit adhering to the combustion pressure sensor 40. Therefore, according to the calculation processing which is executed by the ECU 50 in embodiment 2, precision of the combustion control using CA 50 can be kept even in the situation where deposit adheres to the combustion pressure sensor 40 similarly to the case of embodiment 1.

In the above described calculation flow, the processes in steps S202, S206 and S208 correspond to "the first processing" according to the present invention, and the processing in step S204 corresponds to "the second processing". Further, the processes in steps S216, S218 and S210 in the case of the determination result in step S212 being affirmative correspond to "the third processing", and the processes in steps S216, S218 and S220 in the case of the determination result in step S210 being affirmative correspond to "the fourth processing".

OTHER EMBODIMENTS

CA 50 is one example of the combustion state parameter for combustion control. The crank angle at which the combustion ratio becomes a predetermined ratio other than 50% can be also used as the combustion state parameter. Further, the combustion ratio at a predetermined crank angle can be also used as the combustion state parameter.

In the deposit burning control, the characteristic amount indicating the adhesion amount of deposit is not limited to the heat generation amount. The heat generation rate at a predetermined crank angle in the latter period of combustion or the like can be also used as the characteristic amount indicating the adhesion amount of deposit.

The glow-plug-integrated type combustion pressure sensor is one example of the combustion pressure sensor which includes the pressure receiving member which is displaced in accordance with the pressure in the combustion chamber, and outputs a signal corresponding to displacement of the pressure receiving member. The present invention can be applied to any combustion pressure sensor having the configuration like this without being limited to a glow-plug-integrated type combustion pressure sensor. Further, the internal combustion engine which is a target of combustion control is determined in accordance with the kind of the combustion pressure sensor. In the case of a glow-plug-integrated type combustion pressure sensor, the internal combustion engine to which the glow-plug-integrated type combustion pressure sensor is applied is a diesel engine, but an exclusive combustion pressure sensor could be also applied to a spark ignition type engine.

REFERENCE SIGNS LIST

10 Internal combustion engine
12 Piston
14 Cylinder head
16 Combustion chamber
30 Fuel injection valve
32 Crankshaft
34 Crank angle sensor
38 Hole
40 Combustion pressure sensor
50 ECU
401 Housing
402 Heater rod
403 Seal
404 Strain gauge

The invention claimed is:

1. A combustion control device for an internal combustion engine, comprising:
a combustion pressure sensor including a pressure receiving member that is inserted into a hole leading to a combustion chamber of the internal combustion engine with a vacant space left between the pressure receiving member and the hole, and outputting a signal corresponding to displacement of the pressure receiving member, in response to the pressure receiving member being displaced in accordance with a pressure in the combustion chamber;
a crank angle sensor that outputs a signal synchronized with rotation of a crankshaft of the internal combustion engine; and
an arithmetic processing device that receives the signal from the combustion pressure sensor and the signal from the crank angle sensor, and performs arithmetic operation for controlling a combustion state in the combustion chamber,
wherein the arithmetic processing device is configured to execute:
first processing of calculating a heat generation amount that is a value obtained by totaling a heat amount generated in the combustion chamber from a start of combustion of one combustion cycle for each crank angle in the combustion cycle based on the signal from the combustion pressure sensor and the signal from the crank angle sensor, and thereby generating heat generation amount data in which the heat generation amount and the crank angle are related to each other,
second processing of calculating an estimated heat generation amount that is estimated from a fuel amount, based on the fuel amount supplied to the combustion chamber in the combustion cycle,
processing of determining whether a final value of the heat generation amount in the combustion cycle is larger than the estimated heat generation amount,
third processing of calculating a combustion state parameter expressing a combustion state in the combustion chamber, based on the heat generation amount data from a start of combustion to a crank angle corresponding to the final value of the heat generation amount in the combustion cycle, based on determining that the final value is equal to or smaller than the estimated heat generation amount, and
fourth processing of calculating the combustion state parameter, based on the heat generation amount data within the start of combustion to a crank angle at which the heat generation amount reaches the estimated heat generation amount, based on determining that the final value in the combustion cycle is larger than the estimated heat generation amount.

2. The combustion control device for an internal combustion engine according to claim 1,
wherein the arithmetic processing device calculates the heat generation amount at a time point when a heat amount per unit crank angle, which is generated in the combustion chamber, becomes equal to or smaller than zero, or at a time point when the heat amount per unit crank angle, which is generated in the combustion chamber, becomes equal to or smaller than zero predetermined times in succession.

3. The combustion control device for an internal combustion engine according to claim 1,
wherein the arithmetic processing device finishes calculation of the heat generation amount and executes the fourth processing, when the heat generation amount reaches the estimated heat generation amount in a process of calculating the heat generation amount for each crank angle.

4. The combustion control device for an internal combustion engine according to claim 1,
wherein the arithmetic processing device determines that combustion starts when a heat amount per unit crank angle, which is generated in the combustion chamber, becomes larger than zero.

5. The combustion control device for an internal combustion engine according to claim 1,
wherein the combustion state parameter is a crank angle at which a combustion ratio which is a ratio of a mass of burned fuel to a mass of fuel supplied into the combustion chamber in the combustion cycle becomes a predetermined ratio, and the arithmetic processing device calculates a ratio of the heat generation amount to the final value as the combustion ratio when executing the third processing, and calculates a ratio of the heat generation amount to the estimated heat generation amount as the combustion ratio when executing the fourth processing.

6. The combustion control device for an internal combustion engine according to claim 1, wherein the combustion state parameter is a combustion ratio in a predetermined crank angle, and the arithmetic processing device calculates a ratio of the heat generation amount to the final value as the combustion ratio when executing the third processing, and calculates a ratio of the heat generation amount to the estimated heat generation amount as the combustion ratio when executing the fourth processing.

7. The combustion control device for an internal combustion engine according to claim 1, wherein the arithmetic processing device is configured to:

determine a fuel injection amount of a fuel injection valve; and wherein the arithmetic processing device, when executing the second processing of calculating the estimated heat generation amount that is estimated from the fuel amount, based on the fuel amount supplied to the combustion chamber in the combustion cycle, is configured to:

calculate the estimated heat generation amount based on the fuel injection amount of the fuel injection valve.

8. The combustion control device for an internal combustion engine according to claim 1, wherein the arithmetic processing device is configured to:

execute the third processing or the fourth processing based on comparing the final value of the heat generation amount and the estimated heat generation amount that is determined based on a fuel injection amount.

9. The combustion control device for an internal combustion engine according to claim 1, wherein the arithmetic processing device is configured to:

execute the third processing based on comparing the final value of the heat generation amount and the estimated heat generation amount that is determined based on a fuel injection amount; and prevent the fourth processing from being executed based on executing the third processing.

10. The combustion control device for an internal combustion engine according to claim 1, wherein the arithmetic processing device is configured to:

execute the fourth processing based on comparing the final value of the heat generation amount and the estimated heat generation amount that is determined based on a fuel injection amount; and prevent the third processing from being executed based on executing the fourth processing.

* * * * *